Sept. 2, 1952     C. PYLE ET AL     2,609,334
FALLING-FILM FRACTIONATION
Filed May 7, 1949     2 SHEETS—SHEET 2
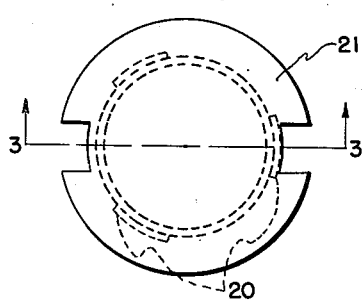
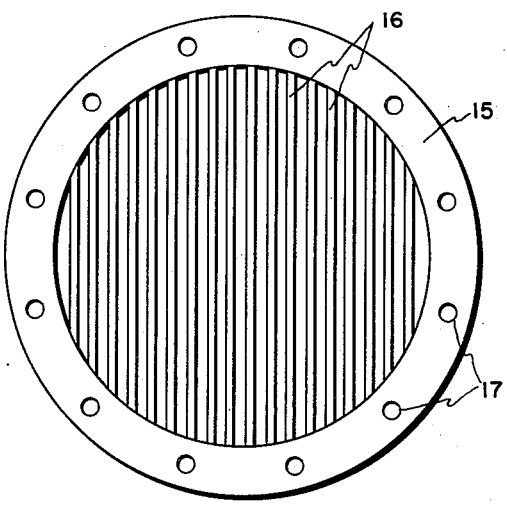
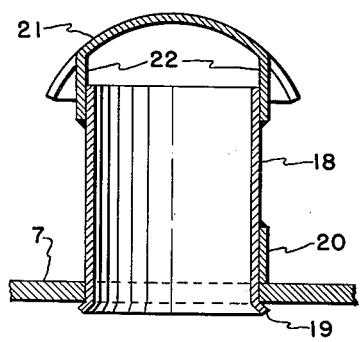
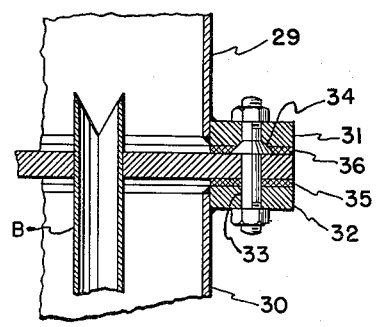
INVENTORS
CYRUS PYLE and
JAMES A. LANE
BY
ATTORNEY Patented Sept. 2, 1952

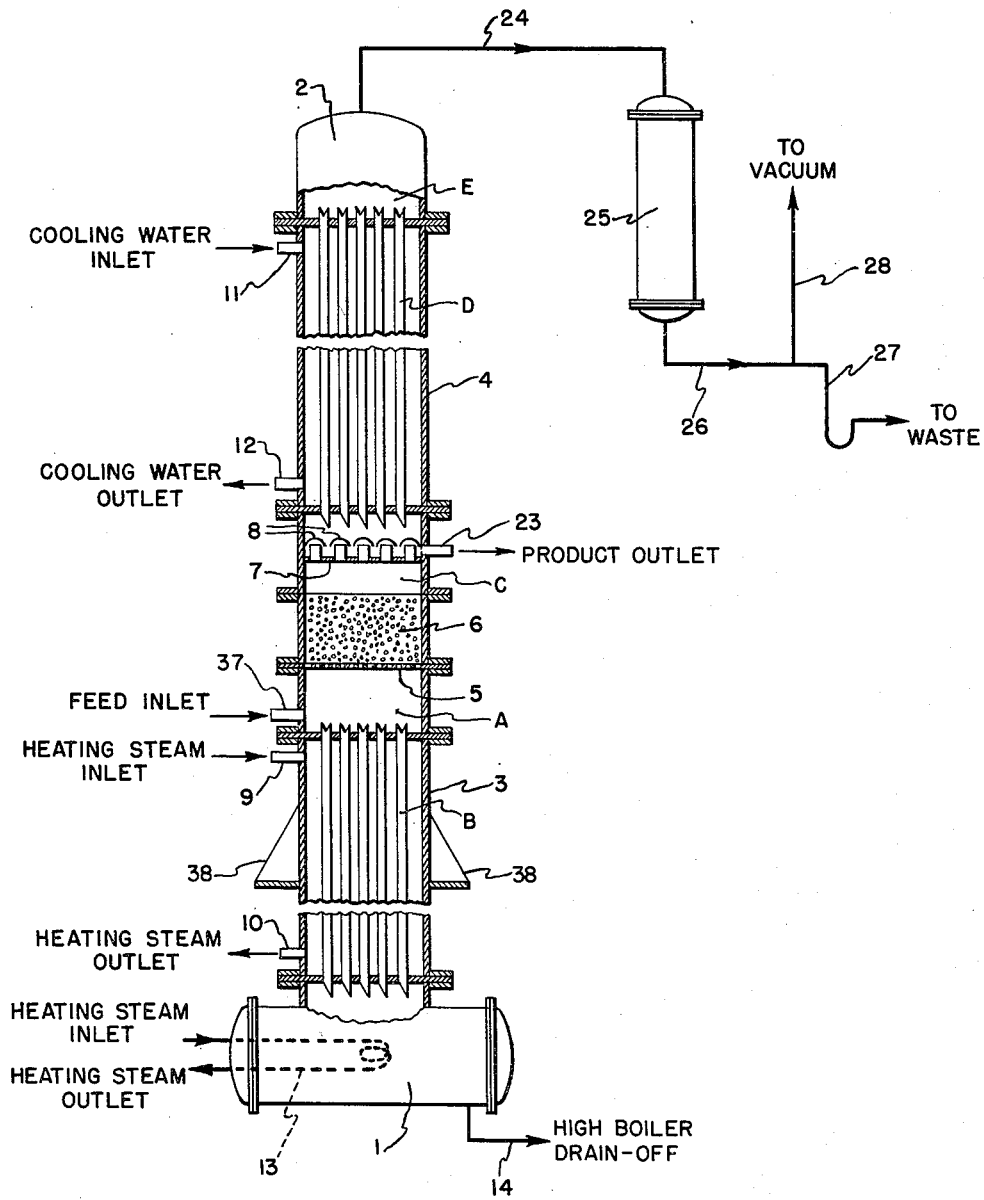

2,609,334

UNITED STATES PATENT OFFICE 2,609,334

FALLING-FILM FRACTIONATION

Cyrus Pyle, New Castle, Del., and James A. Lane, Oak Ridge, Tenn., assignors to E. I. du Pont de Nemours & Company, Wilmington, Del., a corporation of Delaware Application May 7, 1949, Serial No. 91,941

4 Claims. (Cl. 202—40)

This invention relates to a method and apparatus for the falling-film fractionation of liquid materials, and particularly those materials which are heat sensitive or readily polymerizable.

Many organic materials have a tendency to decompose, or polymerize into higher molecular weight compounds, when their temperatures are raised. Since fractional distillation is one of the preferred methods of purifying organic substances, various procedures have been developed in an effort to minimize these composition changes caused by heat exposure. These procedures include steam distillation, vacuum distillation, flash distillation and the addition of inhibitors with the view of avoiding in some degree the disadvantages resulting from overheating.

In the chemical industry it has been customary to supply fabricators and commercial users of polymeric materials with the various chemical components in a form which permits relatively long storage under ordinary conditions of temperature and pressure. Chemical stability in such materials during storage is usually maintained by incorporating therein a relatively small quantity of a polymerization inhibiting substance which is usually removed prior to the utilization of the materials in manufacturing operations. Since the removal of the inhibitor requires complete reprocessing of the polymeric components, the usual practice has been to supply the materials to the users in a relatively impure state, with the understanding that the final refining will be accomplished simultaneously with the removal of the polymerization inhibitor.

A principal object of this invention is to provide an economical, continuous type fractionation process and apparatus for effecting the separation of a polymerizable or heat-sensitive material from impurities and polymerization inhibitors.

Another object of this invention is to provide an improved fractionation process and apparatus for the purification of heat-sensitive materials under conditions minimizing losses of the desired product through polymerization, decomposition and entrainment.

Another object of this invention is to provide simple, compact equipment for the fractionation of heat-sensitive materials.

These and other objects of this invention will become apparent upon consideration of the detailed description and the accompanying drawings in which:

Figure 1 is a partially diagrammatic representation of equipment for the fractionation of heat-sensitive materials according to this invention, with the fractionation column shown in broken section to reveal the details of its internal structure.

Figure 2 is an enlarged plan view of a vapor riser included in the equipment illustrated in Figure 1.

Figure 3 is a sectional elevation taken on line 3—3 of Figure 2, showing one method of attaching the riser pipes to the product draw-off plate illustrated in Figure 1.

Figure 4 is a plan view of one form of grating which may be used to support the entrainment-preventing packing illustrated in Figure 1.

Figure 5 is a fragmentary longitudinal section illustrating the details of construction of the upper end of one of the vaporizing tubes of Figure 1, and also one method for assembling a tube sheet between the adjacent flanges of the several column sections.

The method and apparatus of this invention are particularly directed to the separation of one or more of the components of high relative volatility from a heat-sensitive material, and the recovery of the heat-sensitive material in a relatively high state of purity. This may be accomplished by supplying the heat-sensitive material in the form of relatively thin flowing films and transferring heat into and out of the thin films of the material quickly, so that the sensitive material is exposed to high temperatures for only a brief period and the hold up in the equipment is reduced to a minimum. Also, in order to secure maximum vaporization of the materials during fractionation under vacuum, this process is preferably carried out at absolute pressures of below about 100 mm. Hg, and the apparatus illustrated has been developed with the object of minimizing the pressure drop over the entire column, so that nearly constant pressure is maintained at all points within the column.

As ilustrated in Figure 1, the apparatus preferably comprises a unitary column 2 in open communication at its lower end with a reboiler 1, and having superimposed thereabove within column 2 a vaporizing section 3 and a condensing section 4.

The vaporizing section 3 includes a group of film-forming, vaporizing tubes B as shown in Figure 1. Condensing section 4 includes a similar group of film-forming tubes D which serve as condensing tubes. An inlet chamber A is provided at the upper end of the vaporizing tubes, and a vapor outlet chamber E is provided above the condensing tubes. Interposed between vaporizing section 3 and the condensing section 4 is a grating 5, for supporting a shallow depth of packing material 6. Product collection chamber C is formed by plate 7 interposed between this bed of packing material and condenser section 4. Plate 7 is also provided with a multiplicity of vapor risers 8 for conducting the rising vapors therethrough simultaneously with the collection of the intermediate product on the draw-off plate. As shown in Figure 1, each of the several sections of column 2 may conveniently comprise predetermined lengths of flanged pipe joined together by circumferentially arranged bolts (as shown in Figure 5), with gaskets inserted between adjacent flanges to prevent leakage from the outside atmosphere when the column is operated under vacuum.

Vaporizing section 3 and condensing section 4 are tube bundles rolled into conventional top and bottom tube sheets. These may be supported between adjacent pipe flanges as shown, or they may be welded to the inner column wall if preferred. The sealed spaces thereby formed are utilized for heating the tubes of section 3 by steam introduced through line 9 and withdrawn through line 10, and for cooling the tubes of section 4 by cooling water introduced through line 11 and withdrawn through line 12.

The raw feed material is introduced through inlet pipe 37 into chamber A at such a rate that thin films of the liquid form on the inside walls of the vaporizing tubes. To facilitate even feed distribution, each vaporizing tube is preferably provided with a pair of 60° V-notches disposed in diametrically opposite relationship as indicated in Figure 5.

As the films of feed material pass downwardly over the inner surfaces of the vaporizing tubes, the more volatile components vaporize during the course of the single passage therethrough, and the vapors pass upwardly through the tubes counter-current to the down-flowing films, while the essentially high boiling materials, such as polymerization inhibitors, for example, drip off the beveled ends of the vaporizing tubes into reboiler 1.

Any of the desired volatile product that may have found its way into reboiler 1 is further vaporized by heating coil 13, and the resulting vaporized fractions pass upwardly to combine with the vaporized product produced from the down-flowing liquid films in the vaporizing tubes. The high-boiling fraction may be removed from reboiler 1 through drain-off line 14. A substantially constant liquid level may be maintained within the reboiler during operation, preferably by means of a constant-height weir or a float-controlled valve (not shown), or if desired the high boiling fraction may be withdrawn periodically as accumulations build up.

The vaporized product and lighter fractions thus produced ascend the vaporizing tubes B of section 3 and then pass through grating 5 where any entrained liquid is removed by packing 6, which may consist of Raschig rings, pieces of coke, or other substances chemically unreactive with the process materials. The vaporous material then passes through vapor risers 8 and enters the condensing tubes of section 4.

As shown in Figure 4, grating 5 comprises a ring 15 to which are welded a number of bars 16. The construction is such that approximately three-fourths of the area defined by the inner circumference is open to permit a free passageway for vapors therethrough. Equally spaced bolt holes 17 are provided around the circumference for the reception of bolts for the retention of the ring to the pipe length flanges of column 2. In place of grating 5, a coarse mesh screen or a perforated plate may serve equally well provided the open area is sufficiently large to maintain pressure drop at a minimum.

As shown in Figures 2 and 3, vapor risers 8 comprise tube lengths 18 which may be drawn into liquid-tight contact with draw-off plate 7 by expanding the lower ends 19 outwardly. Placement and retention of the tubes 18 are facilitated by welded tabs 20 circumferentially disposed at equal intervals around the outside surfaces. Tubes 18 are surmounted by rounded bonnets 21, joined thereto by downwardly bent slit portions 22 welded to the outside surfaces of the tubes. Bonnets 21 prevent any liquid draining off the ends of the tubes of section 4 from entering tubes 18, while at the same time permitting the free passage of vapors up through the risers.

In condensing section 4, the higher boiling product fractions contained in the vapors passing upwardly therethrough condense to the liquid phase to produce a film-type condensate flowing downwardly over the inner surfaces of the condensing tubes counter-current to the rising vapors from chamber C. The condensed product drips from the beveled ends of the condensing tubes extending into product chamber C and collect on plate 7 to be drawn off through product outlet 23. Bonnets 21 prevent any leakage of product back through vapor risers 8, and outlet 23 should be below the upper level of tubes 18 so that the product level on plate 7 is maintained below the top of tubes 18.

The fraction more volatile than the product is withdrawn through line 24 and condensed either wholly or in part in condenser 25. Condensate may be recovered or passed to waste through line 26 and barometric leg 27, while vapors are exhausted through line 28 which may be connected with a suitable source of vacuum not shown.

Summarizing the operation of the embodiment illustrated specifically in Figure 1 of the drawing and the foregoing description, the liquid material to be separated may be introduced into inlet chamber A through pipe 37 in regulated flow so as to form down-flowing films of the liquid through the tubes B in heating chamber 3. The more volatile components separate in vapor form from the films thus formed in tubes B and pass upwardly through the tubes counter-currently to the down-flowing film. The high-boiling, unvaporized materials drip from the ends of the tubes B directly into reboiler 1 which further rapidly vaporizes any remaining low volatile products, and these additional vapors combine with the vapors produced in the tubes B. The vapors from tubes B then pass through the shallow bed of packing material supported on grating 5 and through any entrained liquid that may have accumulated therein. The vapors rising through bed 6 pass through vapor risers 8 and upwardly through the tubes D of condenser 4. In these tubes D, a film is also formed of the liquid condensate, and this film flows downwardly counter-current to uncondensed vapors rising through the tubes to chamber E, to be drawn off through outlet 24, for further treatment. The condensate flowing film-wise down the inside surfaces of tubes D is collected in chamber C and may be drawn off continuously through product outlet 23.

As hereinbefore described, the several sections of column 2 may conveniently comprise lengths of flanged pipe of suitable size. One method of fabrication and joinder is illustrated in Figure 5 wherein pipe length 29, forming the section immediately above section 3, is joined to pipe length 30, forming the outer wall of section 3. In this instance the flanges comprise annuli 31 and 32 welded to the ends of 29 and 30 and provided with mating, circumferentially disposed bolt holes for the reception of double-threaded bolts 33. Bolts 33 may be provided with shoulder portions 34 which bear against the upper portions of the tube sheets forming the ends of sections 3 and 4 and thereby maintain the elements of these sections in assembled relationship while still permitting the ready disassembly of upper or lower column sections for cleaning or repairs.

The weight of column 2 may be carried by clip support members 38 welded at equal intervals around the outside of the shell. Clips 38 may be supported on concrete piers or in any other suitable manner so that longitudinal expansion and contraction stresses incident to column operation are readily accommodated.

This invention is especially suitable for the separation of methacrylic acid, a heat-polymerizable material, from water and a polymerization inhibitor comprising a mixture of 35% diphenyl para phenylene diamine and 65% phenyl alpha naphthylamine. For this purpose the vaporizing section 3 may comprise a bundle of 31 1⅛" O. D., #16 U. S. S. tubes, 6'0" in length. The condensing section 4 may be of similar construction, except that tube lengths of 8'0" may be used therein. Column sections of 12" outside diameter pipe are satisfactory.

In such an installation, for example, the crude methacrylic acid feed analyzed 85% methacrylic acid, 14% water and approximately 1% inhibitor. During a series of tests at feed rates of 40 to 120 lbs. per hr. under an absolute pressure of 80 mm. Hg with cooling water at a temperature of 20° C., a product of 96 to 99.5% pure methacrylic acid was produced, representing a yield on the water free basis of 75 to 99%. Methacrylic acid loss in the heads fraction was limited to 0 to 5%. Raschig rings of mixed size ranging from ½"–1" were used as packing material, and the measured pressure drop across the column ranged from 5 to 12 mm. Hg during a series of measurements. The methacrylic acid product was withdrawn through the side outlet substantially in equilibrium with the vapor entering condensing section 4, while the high boiling inhibitor collected in the reboiler and the overhead fraction condensed consisted primarily of water.

It is to be understood that the scope of the invention described herein is not to be limited to the separation of methacrylic acid but that the invention may also be employed for the resolution of many other multicomponent mixtures, the principal requirement being that all the components, except those removed in the same fraction, possess relatively widely different volatilities. Such mixtures may include the ternary systems vinyl acetate (product)-hydroquinone (inhibitor)-acetaldehyde (low boiling impurity); and methyl methacrylate (product)-hydroquinone (inhibitor)-acetone or water, or both (low boiling impurities).

It will be apparent from the foregoing detailed description that this improvement is capable of relatively wide variations in its construction and operation without departing from the spirit and scope of the invention, and it is to be understood that we are not to be limited to the specific embodiments except as defined in the appended patent claims.

We claim:

1. In an apparatus for film-type fractionation of heat-sensitive materials comprising, in combination, a vaporizing unit or zone having a multiplicity of film-forming channels therein, means for introducing heat-sensitive material into the multiplicity of channels to flow in film form downwardly therein, a heating chamber below said vaporizing unit in position to collect unvaporized material from said channels, an upper condensing unit or zone having a multiplicity of similar film-forming channels therein, a product collection chamber interposed between said vaporizing unit and said condensing unit and having a product outlet therefrom, a multiplicity of vapor channels extending through the bottom of said collection chamber and terminating at a level just above the product outlet so that vapors from said vaporizing zone may pass to said condensing zone, countercurrent to said down-flowing condensate.

2. In an apparatus for film-type fractionation of heat-sensitive materials comprising, in combination, a vaporizing unit or zone having a multiplicity of film-forming channels therein, means for introducing heat-sensitive material into the multiplicity of channels to flow in film form downwardly therein, a heating chamber below said vaporizing unit in position to collect unvaporized material from said channels, an upper condensing unit or zone having a multiplicity of similar film-forming channels therein, a condensate entrainment chamber and a product collection chamber interposed between said vaporizing unit and said condensing unit, said collection chamber having a product outlet therefrom, a multiplicity of vapor channels extending through the bottom of said collection chamber and terminating at a level just above the product outlet so that vapors from said vaporizing zone may pass to said condensing zone, countercurrent to said down-flowing condensate.

3. In the falling-film fractionation of liquid materials, introducing the liquid material to be separated into an inlet chamber in regulated flow to form down-flowing films of the liquid through a multiplicity of individual and confined channels, while supplying vaporous heat from a zone below, separating the more volatile components in vapor form from the films thus formed in said channels, passing the vaporous, more volatile components upwardly through the multiplicity of confined narrow channels, countercurrently to the down-flowing film in each confined channel, returning the unvaporized materials flowing from the lowermost point of said channels to the said heating zone below, for further rapid vaporization of any remaining low volatile products therein, and combining said vapors with the vapors simultaneously produced in said channels, passing the vapors from said channels through a shallow bed of packing material saturated with entrained liquid and thence through a collection chamber and upwardly through a group of narrow, individual condensing channels to form films of condensate in each channel, collecting in said collection chamber the condensate formed in said channels and flowing downwardly countercurrent to uncondensed vapors rising through said channels and withdrawing said condensate, while simultaneously and separately withdrawing the rising vapors escaping from the uppermost of the channels.

4. In an apparatus for the separation of one or more components of high relative volatility from a heat-sensitive material in a relatively high state of purity, comprising a reboiler, a unitary column in open communication at its lower end with said reboiler, a vaporizing section and a condensing section superimposed thereabove within said column, said vaporizing section comprising a multiplicity of narrow film-forming, vaporizing channels or tubes, said condensing section comprising also a multiplicity of narrow film-forming channels which serve as condensing tubes, an inlet chamber positioned at the upper end of said vaporizing channels or tubes, a vapor outlet chamber positioned above said condensing channels or tubes, a grating interposed between said vaporizing section and said condensing section, a shallow depth of packing material supported on said grating for entraining condensate from said condensing section, a collection plate interposed between the packing material and condenser section to form a shallow collection chamber, a multiplicity of vapor risers for conducting the vapors through said collection chamber, and means for withdrawing the condensate from said collection chamber.

CYRUS PYLE.
JAMES A. LANE.

REFERENCES CITED

The following references are of record in the file of this patent:

UNITED STATES PATENTS

| Number | Name | Date |
|---|---|---|
| 1,192,889 | Gray | Aug. 1, 1916 |
| 1,282,324 | Tschudy | Oct. 22, 1918 |
| 1,418,885 | Schulze | June 6, 1922 |
| 1,559,701 | Hirt | Nov. 3, 1925 |
| 1,609,822 | Jefferson | Dec. 7, 1926 |
| 1,612,572 | Chillas | Dec. 28, 1926 |
| 1,662,142 | Braun | Mar. 13, 1928 |
| 1,712,789 | Donnelly | May 14, 1929 |
| 1,882,606 | Howard et al. | Oct. 11, 1932 |
| 1,958,547 | Payne | May 15, 1934 |
| 2,018,049 | Allen | Oct. 22, 1935 |
| 2,231,828 | Kerr | Feb. 11, 1941 |
| 2,266,941 | Van de Griendt | Dec. 25, 1941 |
| 2,330,057 | Hunter | Sept. 21, 1943 |
| 2,415,411 | Bowman | Feb. 11, 1947 |
| 2,489,509 | Straight | Nov. 29, 1949 |

FOREIGN PATENTS

| Number | Country | Date |
|---|---|---|
| 586,473 | France | Sept. 24, 1924 |
| 231,791 | Great Britain | Apr. 9, 1925 |
| 595,096 | Great Britain | Nov. 26, 1947 |
| 596,392 | Great Britain | Jan. 2, 1948 |
| 614,388 | Great Britain | Dec. 15, 1948 |

OTHER REFERENCES

Loumiet, "Fundamentals of a New Alcohol Distilling Column," 202-40.

Proceedings of the Nineteenth Annual Meeting of the Association de Technicos Azucareros de Cuba, Dec. 1945, pages 317-341.

Westhaver, "Theory of Open-Tube Distillation Columns," Ind. and Eng. Chem. Jan. 1942, vol. 34, pages 126-130.